March 23, 1937. N. SANDBERG 2,074,675
NOSE PAD FOR OPHTHALMIC MOUNTINGS
Filed Feb. 15, 1935
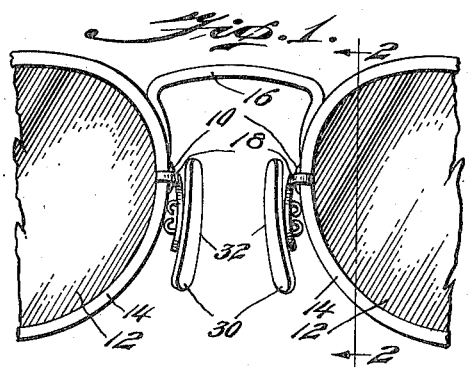
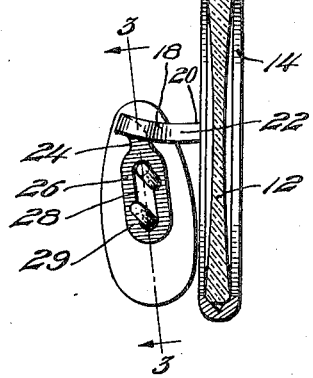
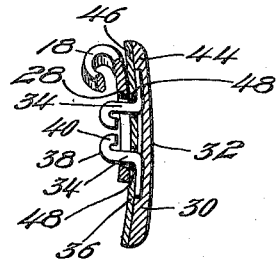
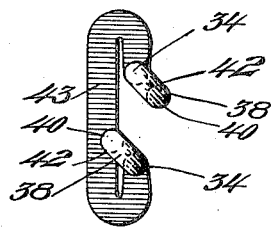
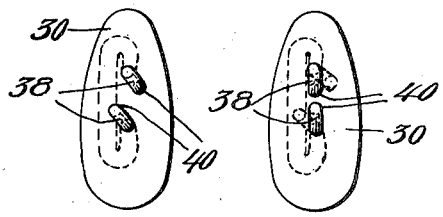
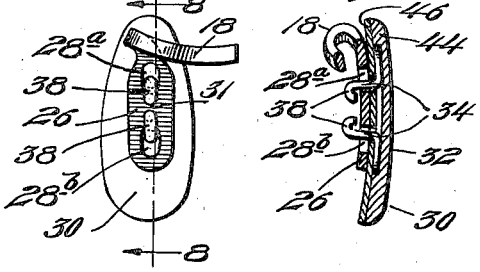
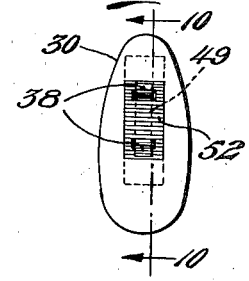
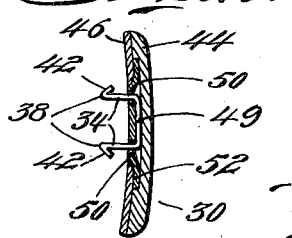
Inventor
Nathaniel Sandberg
By Thomas A. Junckes
Attorney Patented Mar. 23, 1937

2,074,675

UNITED STATES PATENT OFFICE 2,074,675

NOSE PAD FOR OPHTHALMIC MOUNTINGS

Nathaniel Sandberg, Attleboro, Mass.

Application February 15, 1935, Serial No. 6,701

14 Claims. (Cl. 88—48)

My invention relates to improvements in nose gripping means adapted for use with means for holding a lens in position before an eye, whether said means comprises spectacles, eye glasses, or other common ophthalmic types, and includes a novel type of preferably composition nose pad provided with a novel type of nose bar attaching means which permits the quick and ready attachment thereof to said nose bar in a novel fashion.

I am aware that others have provided metallic or other types of nose pads with one or more studs projecting outwardly therefrom adapted to be inserted through suitable hole means in a vertically extending inner head of the nose bar and secured thereto by having the ends thereof upset on the outer surface of said nose bar head. This has involved an operation rather difficult to perform without bending the resilient nose bar out of shape.

An object of my invention therefore is to provide a nose pad of this description which may be readily attached to said nose bar in most embodiments of my invention by merely inserting the studs and attached barbs thereof on the end thereof through an elongated type of hole means in said head, the studs bending inwardly for this purpose for the ready insertion through said hole means and in most embodiments of my invention automatically resiliently bending to a position wherein the barbs overlap the portions of said nose bar head exterior of said elongated hole means, or in other embodiments of my invention wherein the barbs are in alignment for insertion through said hole means and after insertion they may be bent into positions to permanently overlap the portions of the nose bar head exterior of said elongated hole means. It is apparent that with either type of construction if it should be desired to change the nose pad the barbs may be readily bent or readily compressed to a position permitting the removal of said barbs and studs through said elongated hole means to permit withdrawal of the nose pad from the nose bar head.

It is apparent that the barbs may be so spaced from the nose pad as to be spaced any desired amount from the exterior portions of the nose bar head when attached to permit any desired amount of lateral rocking or vertical tilting of the nose pad on the nose bar head, or if desired may be so spaced as to tightly bind the nose pad to the nose bar head.

A further specific feature of my invention relates to the specific type of anchor means I preferably employ adapted to be embedded in a composition nose pad and which preferably comprises a piece of wire bent into a flat loop and having the resilient ends of said wire projecting outwardly therefrom and adapted to project through the vertically aligned elongated hole means in the nose bar head and in which the ends of the wire are bent downwardly to form downwardly disposed loops to form the barbs to overlap the exterior portions of said nose bar head exterior of said hole means to secure said nose pad thereto. It is apparent therefore that with this construction gold or precious metal plated wire may be employed, the ends of the wire in which the base metal might appear being concealed from view.

These and such other objects of my invention as may hereinafter appear will be best understood from a description of the accompanying drawing, which illustrates various embodiments thereof.

In the drawing, Fig. 1 is a rear elevation of a portion of a pair of spectacles equipped with my invention.

Fig. 2 is a cross sectional view thereof taken along the line 2—2 of Fig. 1 showing the outer surface of the nose pad attached to the nose pad bar.

Fig. 3 is a vertical sectional view taken through the nose bar head and nose pad along the line 3—3 of Fig. 2.

Fig. 4 is a plan view of the preferred type of bent wire anchor means I preferably employ.

Fig. 5 is a plan view of a nose pad employing a preferred type of bent wire anchor means, in which the barbs on the ends of the studs thereof are adapted to resiliently automatically bend outwardly after insertion through said elongated hole means to retain the nose pad to the nose bar head.

Fig. 6 is a plan view of a nose pad having similar type of anchor means therein in which the barbs are in vertical alignment for insertion through the elongated hole means of the nose bar head, and may be bent to the dotted line positions as shown, obliquely overlapping the side portions of said nose bar head to secure said nose pad thereto.

Figs. 7 and 8 are views of a slightly different embodiment of my invention, wherein the vertically aligned hole means comprises aligned upper and lower hole means in the upper and lower portions of the enlarged nose bar head, and in which the barbs thereof project inwardly in opposite directions over the center portion of said nose bar head between said hole means to secure said nose pad to said nose bar head.

Fig. 8 is a vertical sectional view of the embodiment shown in Fig. 7, taken along the line 8—8 thereof.

Fig. 9 is a plan view of a slightly different embodiment of my invention employing a composition nose pad and anchor means comprising two members, namely, a U-shaped anchor member having barbs projecting outwardly therefrom, the studs thereof projecting through holes in an anchor plate, the ends of which are suitably embedded between two plastic layers plasticized together.

Fig. 10 is a vertical sectional view of the nose pad shown in Fig. 9 taken along the line 10—10 thereof.

In the drawing, wherein like characters of reference indicate like parts throughout, 10 generally indicates nose gripping means adapted for use with means for holding a lens 12 in position before an eye. Said means for holding a lens in position before an eye may comprise a suitable portion of eye glasses, or as shown, the lens holding rims 14 of spectacles joined together at spaced intervals by the nose piece 16. In either type of means for holding a lens in position before an eye, namely, either eye glasses or spectacles, the nose gripping means includes a nose bar 18 having a front end 20 adapted to be secured to the inner of said lens holding means 14, extending rearwardly as at 22 and then vertically, preferably downwardly as shown as at 24 and terminating in an enlarged flat head 26 extending substantially vertically and tiltable to an angle substantially parallel to the nose and having elongated vertically aligned hole means 28 therein. Said vertically aligned elongated hole means 28 may comprise the elongated hole means extending substantially the height of said head forming the slot 28, as shown in Fig. 2 or the upper and lower elongated hole means 28$^a$ and 28$^b$ substantially vertically aligned as shown in Fig. 7.

The type of nose bar 18 hitherto described with the exception of the elongated hole means 28 therein is a common type of nose bar on the market today.

As stated hitherto, it is also common to provide a substantially flat nose pad 30 constructed of flat metal, composition or other material adapted to abut a side of the nose on the inner surface 32 thereof and having stud means 34 projecting outwardly therefrom from the outer surface 36 thereof adapted to be inserted through suitable usually round hole means 28 in said nose bar head 26 and having the ends thereof upset to overlap the portions 29 of said nose bar head exterior of said hole means 28. The overlapping portions of the upset head have usually been at a slightly spaced distance from the nose bar head to permit a lateral tilting or vertical rocking for adjustment purposes of the nose pad on said nose bar head. This upsetting when once accomplished makes the removal of the nose pad from the nose bar head practically impossible without destruction of the nose pad, is an extra step, and is an extra step involving additional labor and time with its attendant cost.

My invention therefore includes broadly forming the ends of said studs 34 with the resilient barbs 38 projecting preferably in opposite directions to overlap the outer portions 29 of said nose bar head exterior of said hole means 28 to overlappingly secure said nose pad 30 to said nose bar head 26. Said barbs may project, preferably in opposite directions outwardly relative to the center of the nose pad as shown in Figs. 9 and 10, inwardly relative to the center of the nose pad as shown in Figs. 7 and 8, or obliquely laterally or outwardly as shown in Figs. 2—6. The studs 34 are preferably resilient so that if the barbs are in vertical alignment prior to attachment as shown in Figs. 6—10, said studs may bend or be bent to permit insertion thereof through said vertically aligned elongated hole means 28 or 28$^a$ and 28$^b$ either on contact of the inclined heads 42 of said barbs with the sides of said hole means 28 or by relative bending of the stud means, whereupon said studs may bend or be bent to relative positions to permit the ends 40 of the barbs to overlap the respective portions 29 of the nose bar head exterior of said hole means 28 or 28$^a$ and 28$^b$. On the other hand, as shown in Figs. 2—5, the barbs may be bent into vertical alignment for insertion through said elongated hole means whereupon the ends of said barbs may resiliently automatically rotate outwardly or otherwise to cause the ends thereof to overlappingly engage the outer portions 29 of said nose bar head exterior of said hole means 28. If desired, however, the studs 34 and barbs 38 may be constructed of non-resilient material for insertion through said hole means 28, and be of bendable material to permit the barbs 38 to be bent from the full line position shown in Fig. 6 for insertion thereof through said elongated hole means 28 to the dotted line position shown in Fig. 6 to permit the ends 40 thereof to overlappingly engage the portions 29 of said nose bar head exterior of said hole means 28 at the desired spaced distances therefrom.

I have broadly described a substantially flat nose pad, which may be constructed of any suitable material having the two studs 34 projecting therefrom, preferably in substantially vertical alignment terminating in the barbs 38 adapted to automatically bend, or be bent to engage the outer portions 29 of said nose bar head exterior of said hole means 28 to secure said nose pad 30 to said nose bar head. In the preferred embodiment shown I preferably construct my nose pad 30 of composition material and embed a substantially flat anchor member therein having said substantially vertically aligned preferably resilient studs 34 terminating in said barbs 38. In my preferred embodiment, the substantially flat anchor member 43 comprises resilient wire bent into a loop embedded within said composition material and having the two resilient ends thereof projecting outwardly therefrom to form the studs 34 and when attached through said hole means 28 terminating in downwardly disposed loops forming barbs 38 projecting in any of the desired directions hitherto described and as shown in Figs. 1—8, namely, obliquely outwardly as shown in Figs. 2—6, vertically inwardly in opposite directions as shown in Figs. 7 and 8, over the center portions of said nose bar head between the vertically aligned elongated hole means 28$^a$ and 28$^b$ or vertically outwardly in opposite directions as shown in Figs. 9 and 10 over the end portions of said head 26. In the preferred embodiment shown the composition nose pad preferably includes an inner layer of suitable composition material, resilient wire bent into the loop 43 resting upon said lower layer 44 and an upper layer 46 having holes 48 in the upper and lower ends thereof plasticized to said lower layer around said wire loop 43, the resilient ends 34 of said wire projecting outwardly through said upper layer holes 48 and said nose bar head hole means 28 and terminating in said downwardly disposed loops forming the barbs 38. It is apparent therefore that inasmuch as the ends of the wire terminate in the downwardly projecting ends 40 that only the side portions of the barbs 38 and studs 34 will be visible, thus permitting the use of gold or other precious metal plated wire suitably plated on a core of non-visible base metal. Thus as shown in Fig. 5 a type of resilient wire may be employed in which the barbs normally project obliquely outwardly in opposite directions, but in which the barbs may be squeezed together in vertical alignment for passage through said aligned elongated hole means 28 to automatically bend obliquely outwardly in opposite directions, as shown in Figs. 2—4 after insertion of the studs 34 and barbs 38 through said hole means to overlap the outer portions 29 of the nose bar head to secure the nose pad thereto. As shown in Fig. 6, however, wire which is not quite so resilient, but which is capable of bending and retaining a set position may be employed, in which instance the barbs 38 are placed in vertical alignment for insertion through said hole means 28 and after insertion said barbs 38 may be bent obliquely outwardly in opposite directions as shown in Fig. 6 to overlappingly engage the portions 29 of said nose bar head exterior of said elongated hole means 28. If desired the barbs may project inwardly in opposite directions as shown in Fig. 7 to have the ends thereof overlappingly engage the center portion 31 of said nose bar head 26 between said aligned upper and lower elongated hole means 28$^a$ and 28$^b$ or said barbs may project outwardly as shown in Figs. 9 and 10 to after attachment overlappingly engage the top and bottom portions 29 of said nose bar head 26. In either of the embodiments shown in Figs. 7 and 8 and 9 and 10 the studs 34 may be resilient to be bent relative to each other to permit insertion of the barbs through the elongated hole means 28 and permit the barbs to overlappingly engage the respective portions of the nose bar head 26 after insertion or said studs 34 may be constructed of bendable material capable of assuming a set position bendable after insertion thereof through said hole means to a position causing said barb ends 40 to overlap the respective portions of said nose bar head to secure said nose pad thereto.

I have shown in Figs. 9 and 10 a slightly different type of anchor means in which the studs 34 and barbs 38 comprise the outwardly projecting ends of a flat piece of wire bent into a U-shape to have the U-base 49 and in which the studs 34 and barbs 38 thereof projecting outwardly through suitable upper and lower holes 50 in a flat plate 52 adapted to have the ends thereof exterior of said studs 34 embedded between the two respective lower and upper composition layers 44 and 46. While this type of stud, barb and anchor means may be employed, I preferably employ the type shown in Figs. 3—8 consisting of bent wire.

It is understood that my invention is not limited to the specific embodiments shown and that various deviations may be made therefrom without departing from the spirit and scope of the appended claims.

What I claim is:

1. A substantially flat ophthalmic nose pad constructed of composition material having an anchor member comprising gold plated resilient wire bent into a loop embedded in said nose pad and having the resilient ends of said wire projecting outwardly from said nose pad from a side of said loop and adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said wire ends terminating in downwardly disposed loops forming barbs projecting in opposite directions obliquely outwardly to overlap the side portions of said nose bar head to secure said nose pad thereto said ends being bendable to bring said barbs in substantially vertical alignment for insertion through said vertically aligned elongated hole means.

2. A substantially flat ophthalmic nose pad constructed of composition material having an anchor member comprising gold plated resilient wire bent into a loop embedded in said nose pad and having the resilient ends of said wire projecting outwardly from said nose pad from a side of said loop and adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said wire ends terminating in downwardly disposed loops forming barbs projecting in opposite directions to overlap portions of said nose bar head to secure said nose pad thereto.

3. A substantially flat ophthalmic nose pad constructed of composition material having an anchor member comprising resilient wire bent into a loop embedded in said nose pad and having the resilient ends of said wire projecting outwardly from said nose pad from a side of said loop and adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said wire ends terminating in downwardly disposed loops forming barbs projecting outwardly in opposite directions to overlap portions of said nose bar head to secure said nose pad thereto.

4. A substantially flat ophthalmic nose pad constructed of composition material having an anchor member comprising resilient wire bent into a loop embedded in said nose pad and having the resilient ends of said wire projecting outwardly from said nose pad from a side of said loop and adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said wire ends terminating in downwardly disposed loops forming barbs projecting in opposite directions obliquely outwardly to overlap the side portions of said nose bar head to secure said nose pad thereto.

5. A substantially flat ophthalmic nose pad constructed of composition material having an anchor member comprising resilient wire bent into a loop embedded in said nose pad and having the resilient ends of said wire projecting outwardly from said nose pad from a side of said loop and adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said wire ends terminating in downwardly disposed loops forming barbs projecting in opposite directions to overlap portions of said nose bar head to secure said nose pad thereto bendable to bring said barbs in substantially vertical alignment for insertion through said vertically aligned elongated hole means.

6. A substantially flat ophthalmic nose pad constructed of composition material having an anchor member comprising resilient wire bent into a loop embedded in said nose pad and having the resilient ends of said wire projecting outwardly from said nose pad from a side of said loop and adapted to project through two substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said ends terminating in downwardly disposed loops forming barbs projecting inwardly in opposite directions to overlap the center portions of said nose bar head to secure said nose pad thereto.

7. A substantially flat ophthalmic nose pad comprising an inner layer of composition material, gold plated resilient wire bent into a loop resting upon said inner layer and an upper layer having holes near the top and bottom thereof plasticized to said lower layer around said wire loop, the resilient ends of said wire projecting outwardly through said upper layer holes and adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, and terminating in downwardly disposed loop forming barbs projecting in opposite directions obliquely outwardly to overlap the side portions of said nose bar head to secure a nose pad thereto, bendable to bring said barbs in substantially vertical alignment for insertion through said vertically aligned elongated hole means.

8. A substantially flat ophthalmic nose pad comprising an inner layer of composition material, resilient wire bent into a loop resting upon said inner layer and an upper layer having holes near the top and bottom thereof plasticized to said lower layer around said wire loop, the resilient ends of said wire projecting outwardly through said upper layer holes and adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically and terminating in downwardly disposed loop forming barbs projecting in opposite directions to overlap portions of said nose bar head to secure a nose pad thereto.

9. A substantially flat ophthalmic nose pad having substantially vertically aligned resilient studs projecting outwardly therefrom adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said studs terminating in resilient barbs projecting obliquely outwardly in opposite directions to overlap outer portions of said nose bar head exterior of said hole means to secure said nose pad thereto bendable to bring said barbs into substantially vertical alignment for insertion through said vertically aligned elongated hole means.

10. A substantially flat ophthalmic nose pad having substantially vertically aligned studs projecting outwardly therefrom adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said studs terminating in barbs projecting in opposite directions to overlap portions of said nose bar head exterior of said hole means to secure said nose pad thereto.

11. A substantially flat ophthalmic nose pad having substantially vertically aligned studs projecting outwardly therefrom adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said studs terminating in barbs projecting obliquely in opposite directions to overlap outer portions of said nose bar head exterior of said hole means to secure said nose pad thereto.

12. A substantially flat ophthalmic nose pad having substantially vertically aligned resilient studs projecting outwardly therefrom adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said studs terminating in resilient barbs projecting in opposite directions outwardly to overlap the outer portions of said nose bar head exterior of said hole means to secure said nose pad thereto.

13. A substantially flat ophthalmic nose pad having substantially vertically aligned resilient studs projecting outwardly therefrom adapted to project through substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said studs terminating in resilient barbs projecting in opposite vertical directions for insertion through said elongated hole means and then bendable to overlap the side portions of said nose bar head to secure said nose pad thereto.

14. A substantially flat ophthalmic nose pad having substantially vertically aligned studs projecting outwardly therefrom adapted to project through two substantially vertically aligned elongated hole means in an enlarged flat nose bar head, projecting substantially vertically and substantially parallel to the side of the nose, on the rear end of a nose bar having a front end adapted to be secured to the inner edge of means for holding a lens in position before an eye and projecting rearwardly from said means and then vertically, said studs terminating in resilient barbs projecting in opposite directions inwardly to overlap the center portions of said nose bar head between said hole means to secure said nose pad thereto.

NATHANIEL SANDBERG.